United States Patent
Kanazawa et al.

[11] Patent Number: 6,090,496
[45] Date of Patent: Jul. 18, 2000

[54] MAGNETIC RECORDING MEDIUM AND NON-MAGNETIC ALLOY FILM

[75] Inventors: Hiroshi Kanazawa; Hiroshi Sakai; Kazunori Ohnami, all of Chiba, Japan

[73] Assignee: Showa Denko K.K., Tokyo, Japan

[21] Appl. No.: 09/104,345

[22] Filed: Jun. 25, 1998

Related U.S. Application Data

[60] Provisional application No. 60/067,972, Dec. 9, 1997.

[30] Foreign Application Priority Data

Aug. 6, 1997 [JP] Japan ................................ 9-212339
Nov. 10, 1997 [JP] Japan ................................ 9-307659

[51] Int. Cl.⁷ ............................ G11B 5/66; H01F 10/02
[52] U.S. Cl. ...................... 428/617; 427/131; 427/132; 428/336; 428/651; 428/667; 428/678; 428/680; 428/694 TS; 428/900; 428/928
[58] Field of Search .............................. 427/131, 132; 428/617, 336, 651, 667, 678, 680, 694 TS, 900, 928

[56] References Cited

U.S. PATENT DOCUMENTS 4,642,145 2/1987 Masumoto et al. ................ 148/336

*Primary Examiner*—Bernard Pianalto
*Attorney, Agent, or Firm*—Sughrue, Mion, Zinn, Macpeak & Seas, PLLC

[57] ABSTRACT

A magnetic recording medium having sufficiently low noise and high coercive force suitable for use with a MR head. The magnetic recording medium comprises a non-magnetic substrate 1, a non-magnetic underlayer 2, a magnetic layer 3 and a protective layer 4. The magnetic layer comprises a Co alloy and the non-magnetic underlayer comprises a first underlayer 21 comprising an Al—Co—Ni alloy and a second underlayer 22 comprising Cr or a Cr alloy laminated on the first underlayer.

17 Claims, 3 Drawing Sheets

MAGNETIC RECORDING MEDIUM AND NON-MAGNETIC ALLOY FILM

CROSS REFERENCE TO RELATED APPLICATIONS

This application is an application filed under 35 U.S.C. §111(a) claiming benefit pursuant to 35 U.S.C. §119(e) (1) of the filing date of the Provisional Application 60/067,972 filed Dec. 9, 1997 pursuant to 35 U.S.C. §111(b).

FIELD OF THE INVENTION

The present invention relates to a magnetic recording medium such as a magnetic drum, a magnetic tape and a magnetic disc, and more particularly, to a magnetic recording medium having reduced medium noise.

BACKGROUND OF THE INVENTION

In recent years, the density of magnetic disc devices or the like has increased. To accommodate such higher densities, there is a need for a magnetic recording medium (hereinafter sometimes referred to as a "medium") suitable for a magnetic head (hereinafter referred to as a "MR head") using a high magnetic resistance effect that is capable of high reproduction sensitivity.

The MR head has low head noise as compared with conventional magnetoelectric induction type heads. Therefore, the reduction of medium noise has become very important for improving the S/N of the device as a whole.

In a magnetic recording disc for a hard disc device (HDD) commonly used at present, a non-magnetic underlayer (e.g., Cr, Cr alloy), a magnetic layer (e.g., CoCrTa, CoCrPtTa alloy) and a protective layer (e.g., carbon) are provided in sequence on a non-magnetic substrate. Also, a lubricating layer comprising a liquid lubricant is formed thereon.

In order to optimize the recording/reproducing properties of the above-described magnetic recording medium, JP-B-5-23564 (the term "JP-B" as used herein means an "examined Japanese patent publication") proposes a Cr underlayer having a thickness of from 50 to 200 Å in order to increase squareness.

Furthermore, JP-A-1-232522 (the term "JP-A" as used herein means an "unexamined published Japanese patent application") proposes to add one or more metals selected from Cu, Nb, Ti, V, Zr, Mo, Zn, W and Ta to the Cr underlayer in order to enhance the magnetic properties, and particularly coercive force.

Furthermore, EP 0,704,839A1 proposes to use an alloy having a B2 ordered structure (e.g., AlNi, AlCo, AlFe) as the underlayer to reduce the crystal size of the magnetic layer and to thereby provide improved noise characteristics.

When the Cr underlayer is formed having a thickness of from 50 to 200 Å as proposed in JP-B-5-23564, the Cr crystal structure is not oriented toward the (200) plane. As a result, sufficiently high coercivity cannot be obtained and the medium is not suitable for a MR head.

In JP-A-1-232522, the thickness of the Cr underlayer is from 500 to 3,000 Å such that the Cr grains can be oriented toward the (200 plane). Consequently, the noise can be reduced. Furthermore, although Cr or a Cr alloy is used as the non-magnetic underlayer of the smoothened substrate, problems arise in that the anisotropy controlling effect of the disc by texturing or the like is lowered to cause a reduction in coercivity and in turn a decrease in the reproduction output.

When an Al alloy having a B2 ordered structure (e.g., AlNi, AlCo, AlFe, etc.) is used as an underlayer, as proposed in EP 0,704,839A1, the crystal size of the magnetic layer is reduced due to the Al—Ni alloy or Al—Co alloy and the noise is improved. However, it is difficult to increase coercivity using the Al—Ni alloy or to increase coercive squareness using the Al—Co alloy. Accordingly, the reproduction output is small. Thus, a problem still remains in performing high density recording.

SUMMARY OF THE INVENTION

It is therefore an object of the present invention to provide a magnetic recording medium suitable for a MR head, having both reduced noise and high coercivity.

The present invention solves the above problems of the prior art by providing a magnetic recording medium comprising a non-magnetic substrate having thereon a non-magnetic underlayer and a magnetic layer comprising a Co alloy provided on the non-magnetic underlayer, wherein said non-magnetic underlayer comprises a first underlayer comprising an Al—Co—Ni alloy and a second underlayer provided on said first underlayer comprising Cr or a Cr alloy comprising Cr and one or more of Ti, Mo, Al, Ta, W, Ni, B, Si and V.

DESCRIPTION OF THE PREFERRED EMBODIMENTS

Figure 1:
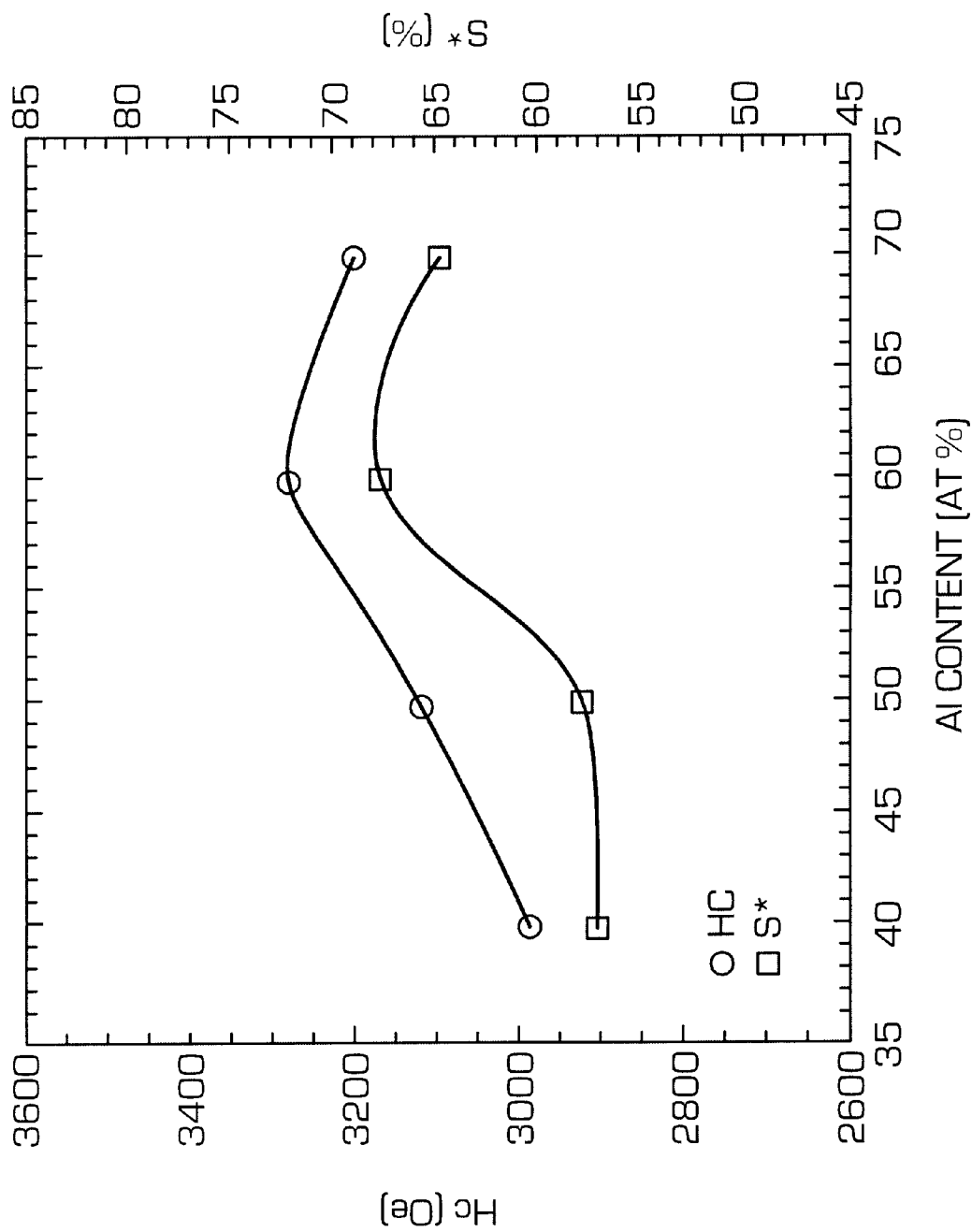
FIG. 1 is a graph showing the change in magnetic properties of a magnetic disc having an Al—Co alloy underlayer as a function of the Al content of the alloy.
Figure 2:
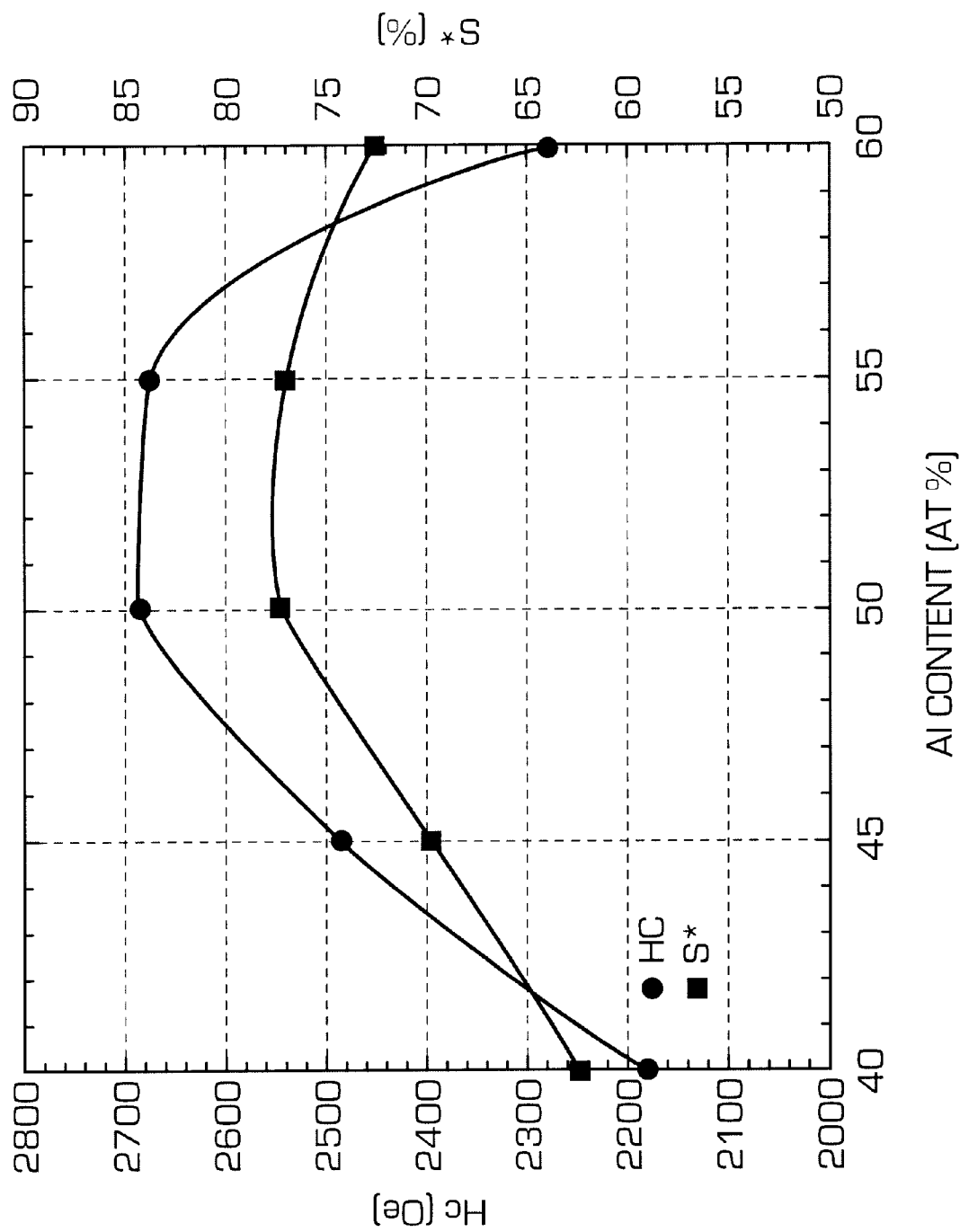
FIG. 2 is a graph showing the change in magnetic properties of a magnetic disc having an Al—Co alloy underlayer as a function of the Al content of the alloy.

FIG. 1 (Al—Co alloy underlayer) and FIG. 2 (Al—Ni alloy underlayer) each shows the change in magnetic properties of a magnetic disc by varying the composition ratio of Al—Co or Al—Ni in the Al—Co or Al—Ni alloy underlayer. The magnetic discs used for these measurements were produced in the same manner as described in the following Examples, except for using an Al—Co alloy or Al—Ni alloy as the underlayer. The magnetic properties were also measured in the same manner as in the Examples described below.

With the Al—Co alloy, a high coercivity exceeding 3,200 Oe can be obtained, however, the coercive squareness (S*) is only about 68% at most. Accordingly, the reproduction output is reduced despite the high coercivity. On the other hand, with the Al—Ni alloy, a coercive squareness (S*) exceeding 75% can be obtained, however, the coercivity is only 2,700 Oe or less as compared with the Al—Co alloy. Also, there is still a problem with respect to recording/reproducing properties in the high density region.

As described above, when an Al—Co alloy or Al—Ni alloy is used alone as the underlayer, satisfactory properties cannot be obtained. Accordingly, the present inventors conducted extensive studies for the purpose of achieving both the high coercivity of an Al—Co alloy and the high coercive squareness of an Al—Ni alloy by mixing an Al—Co alloy with an Al—Ni alloy. More specifically, an $Al_{60}Co_{40}$ (at %, namely, atomic number %, hereinafter at % is omitted) alloy and an $Al_{50}Ni_{50}$ alloy, which are compositions having the highest properties of the Al—Co alloys and Al—Ni alloys shown in FIG. 1 and FIG. 2, were mixed. As a result, the present inventors discovered that when an Al—Co—Ni ternary alloy thus obtained is used as an underlayer, the drawback of the $Al_{50}Ni_{50}$ alloy (low coercivity) is overcome and a low noise recording medium having high coercivity can be obtained. Thus, the magnetic recording medium of the present invention has been accomplished based on these findings.

In the non-magnetic underlayer of the present invention, the first underlayer comprising an Al—Co—Ni alloy preferably has a composition of 50.1 at $\% \leq Al \leq 56$ at % and 0.4 at $\% \leq Co \leq 24$ at %, with the balance being substantially Ni, namely, 20 at $\% \leq Ni \leq 49.5$ at %. Within this range, the magnetic recording medium can have both high coercivity and high coercive squareness (S*). The composition is more preferably 51 at $\% \leq Al \leq 51.5$ at % and 4 at $\% \leq Co \leq 6$ at %, with the balance being substantially Ni, namely, 42.5 at $\% \leq Ni \leq 45$ at %.

In determining the composition of this Al—Co—Ni alloy, the basis may be the mixing ratios of the $Al_{60}Co_{40}$ alloy and $Al_{50}Ni_{50}$ alloy which offer the highest properties of the Al—Co and Al—Ni alloys as described above. If the mixing ratio of the $Al_{60}Co_{40}$ alloy to $Al_{50}Ni_{50}$ alloy is too small, the coercivity is not sufficiently increased. On the other hand, if the mixing ratio is too large, the coercive force may be increased but the coercive squareness (S*) decreases such that high output is not obtained. Therefore, the resulting medium is not suitable for use with a MR head. Taking the above into account, the mixing ratio of the $Al_{60}Co_{40}$ alloy to the $Al_{50}Ni_{50}$ alloy in the first underlayer composition is preferably 1.0 mol $\% \leq Al_{60}Co_{40} \leq 60$ mol %, and in order to manufacture a high output and low noise medium, the mixing ratio is more preferably 10 mol $\% \leq Al_{60}Co_{40} \leq 15$ mol %.

The non-magnetic substrate for use in the present invention includes an Al alloy having formed thereon a NiP plating film (hereinafter referred to as a "NiP plated Al substrate") commonly used as a substrate for magnetic recording media, a glass substrate which can provide excellent surface smoothness and a silicon substrate. In a recording medium for a MR head, as the recording density increases, the flying height of the head must be lowered. Accordingly, a smooth substrate surface is preferred. More specifically, the non-magnetic substrate for use in the present invention preferably has an average surface roughness Ra of 20 Å or less.

The magnetic layer of the present invention comprises a Co alloy film. Particularly, Co—Cr—Ta, Co—Cr—Pt and Co—Cr—Pt—Ta alloys are preferred, and in order to best provide the effects of the non-magnetic underlayer of the present invention, a Co—Cr—Pt—Ta alloy is more preferred.

The Co—Cr—Pt—Ta alloy represented by the compositional formula $Co_{(100-X-Y-Z)}Cr_XPt_YTa_Z$ preferably has a composition of 13 at $\% \leq X \leq 20$ at %, 1 at $\% \leq Y \leq 12$ at % and 2 at $\% \leq Z \leq 7$ at %. The Cr content is from 13 to 20 at % because if it is less than 13 at %, the dispersion of Co particles due to segregation of Cr is insufficient, whereas if the Co content exceeds 20 at %, the coercivity Hc is noticeably reduced and the medium tends to be unsuitable for use with a MR head. The Pt content is from 1 to 12 at % because if it is less than 1 at %, high coercivity Hc cannot be obtained, whereas if it exceeds 12 at %, noise tends to increase. The Ta content is from 2 to 7 at % because if it is less than 2 at %, noise tends to increase, whereas if it exceeds 7 at %, high coercivity Hc is difficult to obtain.

The first underlayer of the present invention preferably has a thickness of from 25 to 1,500 Å. The first underlayer may have any thickness as long as it falls within this range, however, the first underlayer more preferably has a thickness of from 400 to 1,000 Å.

The second underlayer preferably has a thickness of from 1 to 1,000 Å. The second underlayer may have any thickness as long as it falls within this range, however, the second underlayer more preferably has a thickness of from 50 to 200 Å.

The second underlayer comprises Cr, or a Cr alloy comprising Cr and one or more of Ti, Mo, Al, Ta, W, Ni, B, Si and V depending on the intended application. When the second underlayer comprises a Cr alloy, the Cr content is preferably at least 50 at %.

The thickness of the Co alloy magnetic layer is not particularly limited. However, in the case of amagnetic recording medium for a MR head, the thickness is preferably adjusted to have a remanent magnetization layer thickness product BrT of from 50 to 130 G$\mu$m. If the remanent magnetization layer thickness product BrT is less than 50 G$\mu$m, sufficient output is difficult to attain, whereas if it exceeds 130 G$\mu$m, properties suitable for use with a MR head are difficult to obtain.

In the magnetic recording medium, a protective layer may be laminated on the magnetic layer so as to prevent damage due to contact between the head and the medium surface. The material for the protective layer may be a known protective layer material such as carbon.

The present invention is described below by reference to the following Examples, however, the present invention should not be construed as being limited thereto.

EXAMPLES

Example 1

Figure 3:
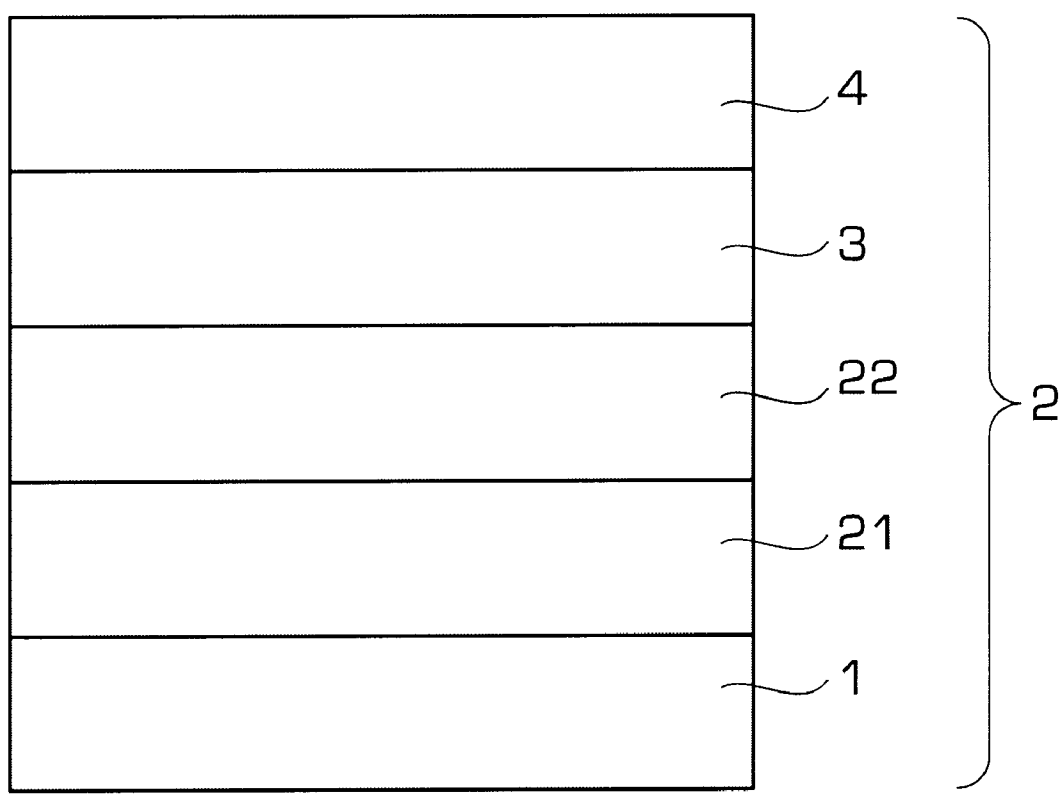
FIG. 3 is a view showing a cross-sectional structure of a magnetic disc according to one embodiment of the present invention.

A NiP plated Al substrate was textured to have a surface roughness Ra of 15 Å and set in a DC magnetron sputtering apparatus. After evacuating to $2 \times 10^{-7}$ Torr, an $Al_{53}Ni_{34.5}Co_{12.5}$ alloy film as a first underlayer was formed on the substrate to a thickness of 700 Å. Then, a Cr film as a second underlayer was formed on the first underlayer to a thickness of 200 Å, and subsequently a $Co_{75}Cr_{16}Pt_6Ta_3$ alloy magnetic film was formed thereon. Furthermore, a carbon film as a protective layer was formed on the magnetic layer to a thickness of 150 Å. The Ar pressure during each of the film forming steps was 3 mTorr. The layer thickness of the magnetic layer was 115 G$\mu$m in terms of the remanent magnetization layer thickness product (BrT). The structure of the magnetic recording medium thus obtained is schematically shown in FIG. 3. In FIG. 3, 1 is a non-magnetic substrate (NiP plated Al substrate), 2 is a non-magnetic underlayer comprising a first underlayer 21 and a second underlayer 22, 3 is a magnetic layer and 4 is a protective layer.

The magnetic properties of the magnetic recording medium prepared in Example 1 were measured using a vibrating sample magnetometry (VSM) technique. The coercivity (Hc) was 3,027 Oe and the coercive squareness (S*) was 78.4%. The recording/reproducing properties of the magnetic recording medium were evaluated using a composite thin film magnetic head having a magnetic resistant (MR) element for reproduction, at a linear recording density of 148.5 kFCI. The magnetic recording medium of Example 1 had a recording/reproducing output of 248 $\mu$V and a noise of 2.28 $\mu$V.

Example 2

A magnetic recording medium was prepared in the same manner as in Example 1, except for forming an $Al_{56}Ni_{25}Co_{19}$ alloy film having a thickness of 600 Å as a first underlayer.

The magnetic properties and the recording/reproducing properties of the magnetic recording medium thus prepared were measured in the same manner as in Example 1. The coercivity (Hc) was 3,320 Oe, the coercive squareness (S*) was 72.0%, and the recording/reproducing properties of the magnetic recording medium were such that the recording/reproducing output was 239 μV and the noise was 2.31 μV.

Example 3

A magnetic recording medium was prepared in the same manner as in Example 1, except for forming an $Al_{51}Ni_{47.5}Co_1$ alloy film having a thickness of 600 Å as the first underlayer.

The magnetic properties and the recording/reproducing properties of the magnetic recording medium thus prepared were measured in the same manner as in Example 1. The coercivity (Hc) was 2,783 Oe, the coercive squareness (S*) was 80.3%, and the recording/reproducing properties of the magnetic recording medium were such that the recording/reproducing output was 244 μV and the noise was 2.34 μV.

Comparative Example 1

A NiP plated Al substrate was textured to have a surface roughness Ra of 15 Å and set in a DC magnetron sputtering apparatus. After evacuating to $2 \times 10^{-7}$ Torr, an $Al_{60}Co_{40}$ alloy film as a first underlayer was formed to a thickness of 600 Å. Then, a Cr film as a second underlayer was formed on the first underlayer to a thickness of 200 Å, and subsequently a $Co_{75}Cr_{16}Pt_6Ta_3$ alloy magnetic film was formed thereon. Furthermore, a carbon film as a protective layer was formed on the magnetic layer to a thickness of 150 Å. The Ar pressure during each of the film forming steps was 3 mTorr. The layer thickness of the magnetic layer was 115 Gμm in terms of the remanent magnetization layer thickness product (BrT).

The magnetic properties and the recording/reproducing properties of the magnetic recording medium prepared in Comparative Example 1 were measured in the same manner as in Example 1. The coercivity (Hc) was 3,282 Oe, the coercive squareness (S*) was 67.8%, and the properties of the magnetic recording medium were such that the output was 210 μV and the noise was 2.51 μV.

Comparative Example 2

A magnetic recording medium was prepared in the same manner as in Comparative Example 1, except for forming an $Al_{50}Ni_{50}$ alloy film having a thickness of 600 Å as a first underlayer.

The magnetic properties and the recording/reproducing properties of the magnetic recording medium prepared in Comparative Example 2 were measured in the same manner as in Example 1. The coercivity (Hc) was 2,692 Oe, the coercive squareness (S*) was 77.6%, and the recording/reproducing properties of the magnetic recording medium were such that the recording/reproducing output was 231 μV and the noise was 2.48 μV.

The evaluation results of Examples 1 to 3 and Comparative Examples 1 and 2 are shown below.

| No. | First Underlayer (at %) | Hc (Oe) | S* (%) | Reproduction Output (μV) | Noise (μV) |
|---|---|---|---|---|---|
| Example 1 | $Al_{53}Ni_{34.5}Co_{12.5}$ | 3027 | 78.4 | 248 | 2.28 |
| Example 2 | $Al_{56}Ni_{25}Co_{19}$ | 3320 | 72.0 | 239 | 2.31 |
| Example 3 | $Al_{51.5}Ni_{47.5}Co_1$ | 2783 | 80.3 | 244 | 2.34 |
| Comparative Example 1 | $Al_{60}Co_{40}$ | 3282 | 67.8 | 210 | 2.51 |
| Comparative Example 2 | $Al_{50}Ni_{50}$ | 2692 | 77.6 | 231 | 2.48 |

As shown above, the magnetic recording medium of the present invention having an Al—Co—Ni alloy underlayer can provide both higher output and lower noise as compared to a recording medium having either an Al—Co or an Al—Ni alloy underlayer. Therefore, the inventive magnetic recording medium is well adapted as a high-density magnetic recording medium for use with a MR head.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic substrate having thereon a non-magnetic underlayer and a magnetic layer comprising a Co alloy provided on the non-magnetic underlayer, wherein said non-magnetic underlayer comprises a first underlayer comprising an Al—Co—Ni alloy and a second underlayer provided on said first underlayer comprising Cr or a Cr alloy.

2. The magnetic recording medium as claimed in claim 1, wherein said first underlayer comprises an Al—Co—Ni alloy having a composition of 50.1 at $\% \leq Al \leq 56$ at %, 0.4 at $\% \leq Co \leq 24$ at % and 20 at $\% \leq Ni \leq 49.5$ at %.

3. The magnetic recording medium as claimed in claim 2, wherein said first underlayer has a thickness of from 25 to 1,500 Å.

4. The magnetic recording medium as claimed in claim 2, wherein said second underlayer has a thickness of from 1 to 1,000 Å.

5. The magnetic recording medium as claimed in claim 2, wherein said magnetic layer is an alloy film mainly comprising Co.

6. The magnetic recording medium as claimed in claim 1, wherein said first underlayer has a thickness of from 25 to 1,500 Å.

7. The magnetic recording medium as claimed in claim 1, wherein said first underlayer consists essentially of an Al—Co—Ni alloy having a composition of 50.1 at $\% \leq Al \leq 56$ at %, 0.4 at $\% \leq Co \leq 24$ at % and 20 at $\% \leq Ni \leq 49.5$ at %.

8. The magnetic recording medium as claimed in claim 1, wherein said second underlayer has a thickness of from 1 to 1,000 Å.

9. The magnetic recording medium as claimed in claim 1, wherein said first underlayer comprises an Al—Co—Ni alloy having a composition of 51 at $\% \leq Al \leq 51.5$ at %, 4 at $\% \leq Co \leq 6$ at % and 42.5 at $\% \leq Ni \leq 45$ at %.

10. The magnetic recording medium as claimed in claim 1, wherein the magnetic layer comprises a $Co_{(100-X-Y-Z)}Cr_XPt_YTa_Z$ alloy wherein 13 at $\% \leq X \leq 20$ at %, 1 at $\% \leq Y \leq 12$ at % and 2 at $\% \leq Z \leq 7$ at %.

11. The magnetic recording medium as claimed in claim 1, wherein the magnetic layer has a remanent magnetization layer thickness product BrT of from 50 to 130 Gμm.

12. The magnetic recording medium as claimed in claim 1, wherein said magnetic layer is an alloy film mainly comprising Co.

13. The magnetic recording medium as claimed in claim 1, wherein said second underlayer comprises Cr or a Cr alloy comprising Cr and one or more of Ti, Mo, Al, Ta, W, Ni, B, Si and V.

14. The magnetic recording medium as claimed in claim 1, wherein said non-magnetic substrate comprises an Al substrate plate d with NiP.

15. The magnetic recording medium as claimed in claim 1, wherein said non-magnetic substrate comprises a glass substrate.

16. A magnetic recording medium comprising a non-magnetic substrate having thereon a first non-magnetic underlayer comprising an Al—Co—Ni alloy having a composition of 50.1 at %$\leq$Al$\leq$56 at %, 0.4 at %$\leq$Co$\leq$24 at % and 20 at %$\leq$Ni$\leq$49.5 at %; a second non-magnetic underlayer laminated on said first non-magnetic underlayer comprising Cr or a Cr alloy comprising Cr and one or more of Ti, Mo, Al, Ta, W, Ni, B, Si and V; and a magnetic layer provided on said second non-magnetic underlayer comprising a $Co_{(100-X-Y-Z)}Cr_XPt_YTa_Z$ alloy wherein 13 at %$\leq$X$\leq$20 at %, 1 at %$\leq$Y$\leq$12 at % and 2 at %$\leq$Z$\leq$7 at %.

17. A non-magnetic alloy film comprising 50.1 at %$\leq$Al$\leq$56 at %, 0.4 at %$\leq$Co$\leq$24 at %, and 20 at %$\leq$Ni$\leq$49.5 at %.

* * * * *